United States Patent
Lambert et al.

(10) Patent No.: US 11,210,172 B2
(45) Date of Patent: *Dec. 28, 2021

(54) SYSTEM AND METHOD FOR INFORMATION HANDLING SYSTEM BOOT STATUS AND ERROR DATA CAPTURE AND ANALYSIS

(71) Applicant: DELL PRODUCTS, LP, Round Rock, TX (US)

(72) Inventors: Timothy M. Lambert, Austin, TX (US); Andrew Butcher, Cedar Park, TX (US); Anh Luong, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/824,388

(22) Filed: Mar. 19, 2020

(65) Prior Publication Data

US 2020/0218613 A1 Jul. 9, 2020

Related U.S. Application Data

(63) Continuation of application No. 15/486,666, filed on Apr. 13, 2017, now Pat. No. 10,599,521.

(51) Int. Cl.
| | |
|---|---|
| *G06F 11/14* | (2006.01) |
| *G06F 11/22* | (2006.01) |
| *G06F 11/07* | (2006.01) |
| *G06F 9/4401* | (2018.01) |

(52) U.S. Cl.
CPC ........ *G06F 11/1417* (2013.01); *G06F 9/4405* (2013.01); *G06F 11/0766* (2013.01); *G06F 11/2284* (2013.01)

(58) Field of Classification Search
CPC ............ G06F 11/2284; G06F 11/2268; G06F 11/008; G06F 11/07; G06F 11/0751; G06F 11/0766; G06F 11/079; G06F 11/0793; G06F 11/2247; G06F 11/2289; G06F 2011/2278; G06F 9/4401; G06F 11/2221; G06F 11/1417; G06F 9/4405
See application file for complete search history.

(56) References Cited

U.S. PATENT DOCUMENTS

| | | |
|---|---|---|
| 5,974,546 A | 10/1999 | Anderson |
| 6,393,586 B1 | 5/2002 | Sloan et al. |
| 6,754,817 B2 | 6/2004 | Kharti et al. |

(Continued)

*Primary Examiner* — Phil K Nguyen
*Assistant Examiner* — Brian J Corcoran
(74) *Attorney, Agent, or Firm* — Larson Newman, LLP

(57) ABSTRACT

An information handling system includes a processor complex and a baseboard management controller (BMC). The processor complex provides boot status information in response to a system boot process of the processor complex. The BMC receives first boot status information from the processor complex in response to a first system boot process, compares the first boot status information to baseline status information to determine first boot status difference information, compares the first boot status difference information to baseline boot status difference information to determine that the information handling system experienced an anomaly during the first system boot process, and sends an alert that indicates that the first system boot process experienced the anomaly.

15 Claims, 4 Drawing Sheets

(56) References Cited

U.S. PATENT DOCUMENTS

| | | |
|---|---|---|
| 6,807,629 B1 | 10/2004 | Billick et al. |
| 7,225,327 B1 | 5/2007 | Rasmussen et al. |
| 8,504,875 B2 | 7/2013 | Orita et al. |
| 9,135,440 B2 | 9/2015 | Prowell et al. |
| 10,102,056 B1 | 10/2018 | Goldberg |
| 2004/0228063 A1 | 11/2004 | Hawkins et al. |
| 2007/0011536 A1* | 1/2007 | Khanna ............... G06F 11/27 714/733 |
| 2007/0162732 A1 | 7/2007 | Diwan et al. |
| 2007/0174705 A1 | 7/2007 | Shih |
| 2008/0141076 A1* | 6/2008 | Hu ..................... G06F 11/00 714/45 |
| 2009/0144585 A1 | 6/2009 | Lu |
| 2009/0240990 A1* | 9/2009 | Gollub ............... G06F 11/079 714/45 |
| 2009/0259888 A1* | 10/2009 | Gao ................. G06F 11/2284 714/30 |
| 2011/0055631 A1 | 3/2011 | Chin et al. |
| 2012/0192003 A1 | 7/2012 | Akiyama et al. |
| 2013/0138939 A1 | 5/2013 | Chen |
| 2013/0342544 A1 | 12/2013 | Winberg et al. |
| 2015/0113309 A1 | 4/2015 | Grieco et al. |
| 2015/0227409 A1* | 8/2015 | Ricken ............... G06F 11/0709 714/47.2 |
| 2015/0370681 A1 | 12/2015 | Tonry et al. |
| 2016/0085607 A1 | 3/2016 | Marr et al. |

\* cited by examiner

SYSTEM AND METHOD FOR INFORMATION HANDLING SYSTEM BOOT STATUS AND ERROR DATA CAPTURE AND ANALYSIS

CROSS-REFERENCE TO RELATED APPLICATION

This application is a continuation of U.S. patent application Ser. No. 15/486,666 entitled "System and Method for Information Handling System Boot Status and Error Data Capture and Analysis" filed on Apr. 13, 2017, the disclosure of which is hereby expressly incorporated by reference in its entirety.

FIELD OF THE DISCLOSURE

This disclosure generally relates to information handling systems, and more particularly relates to information handling system boot status and error data capture and analysis.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processor complex and a baseboard management controller (BMC). The processor complex may provide boot status information in response to a system boot process of the processor complex. The BMC may receive first boot status information from the processor complex in response to a first system boot process, compare the first boot status information to baseline status information to determine first boot status difference information, compare the first boot status difference information to baseline boot status difference information to determine that the information handling system experienced an anomaly during the first system boot process, and send an alert that indicates that the first system boot process experienced the anomaly.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
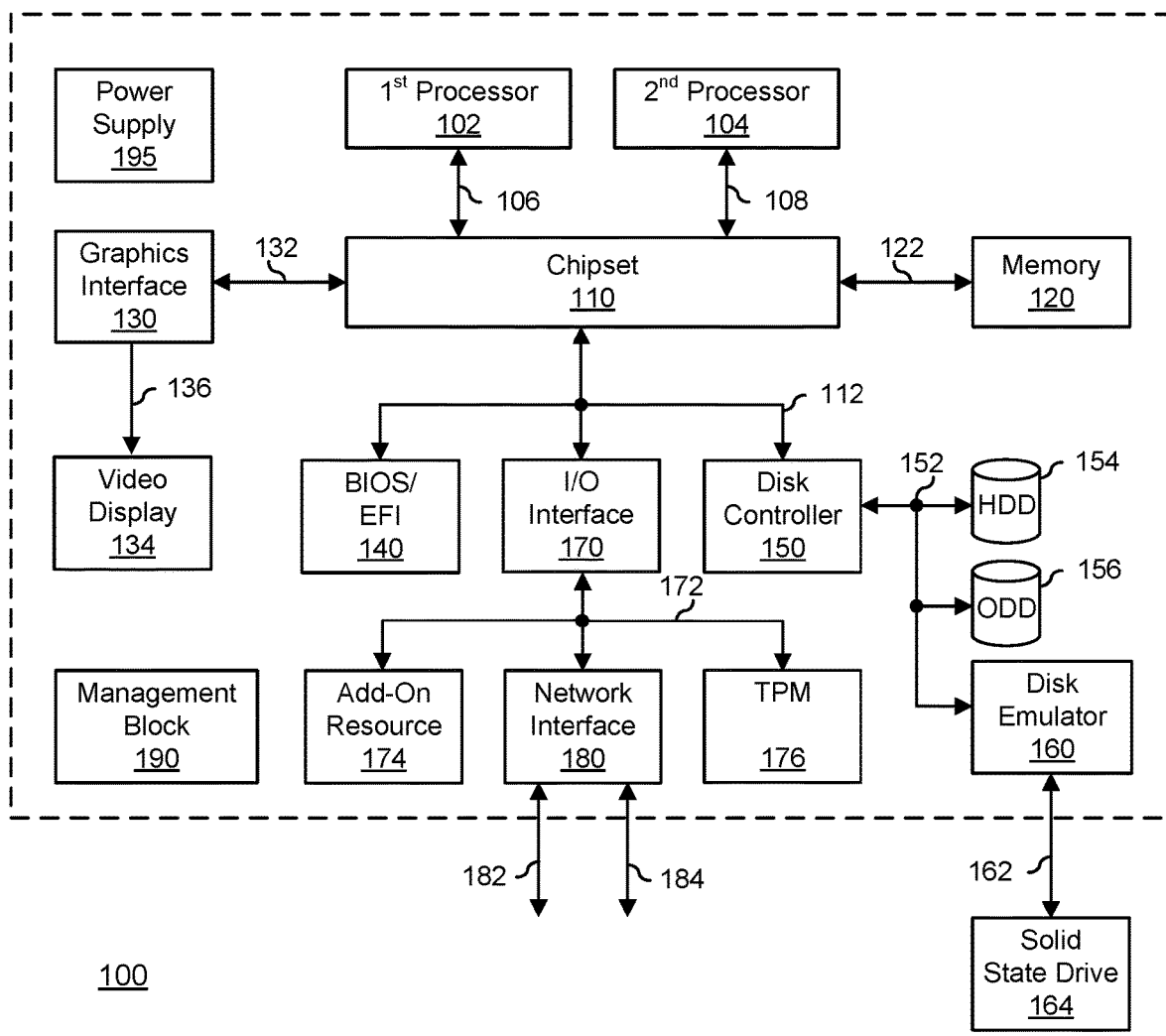
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the OPF system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/extensible firmware interface (BIOS/EFI) module 140, a disk controller 150, a hard disk drive (HDD) 154, an optical disk drive (ODD) 156, a disk emulator 160 connected to an external solid state drive (SSD) 162, an input/output (I/O) interface 170, one or more add-on resources 174, a trusted platform module (TPM) 176, a network interface 180, a management block 190, and a power supply 195. Processors 102 and 104, chipset 110, memory 120, graphics interface 130, BIOS/EFI module 140, disk controller 150, HDD 154, ODD 156, disk emulator 160, SSD 162, I/O interface 170, add-on resources 174, TPM 176, and network interface 180 operate together to provide a host environment of information handling system 100 that operates to provide the data processing functionality of the information handling system. The host environment operates to execute machine-executable code, including platform BIOS/EFI code, device firmware, operating system code, applications, programs, and the like, to perform the data processing tasks associated with information handling system 100.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management block 190 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. In particular, management block 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management block 190 can include a network connection to an external management system, and the management block can communicate with the management system to report status information for information handling system 100, to receive BIOS/UEFI or system firmware updates, or to perform other task for managing and controlling the operation of information handling system 100. Management block 190 can operate off of a separate power plane from the components of the host environment so that the management block receives power to manage information handling system 100 when the information handling system is otherwise shut down. An example of management block 190 may include a commercially available BMC product that operates in accordance with an Intelligent Platform Management Initiative (IPMI) specification, such as a Integrated Dell Remote Access Controller (iDRAC), or the like. Management block 190 may further include associated memory devices, logic devices, security devices, or the like, as needed or desired.

Power supply 195 represents one or more devices for power distribution to the components of information handling system 100. In particular, power supply 195 can include a main power supply that receives power from an input power source, such as a wall power outlet, a power strip, a battery, or another power source, as needed or desired. Here, power source 195 operates to convert the power at a first voltage level from the input power source to one or more power rails that are utilized by the components of information handling system. Power supply 195 can also include one or more voltage regulators (VRs) that each receive power from the main power supply and that operate to convert the input voltage to an output voltage that is used by one or more components of information handling system. For example, a VR can be provided for each of processors 102 and 104, and another VR can be provided for memory 120. Power supply 195 can be configured to provide a first power plane that provides power to the host environment, and to provide a second power plane that provides power to the management environment.

Figure 2:
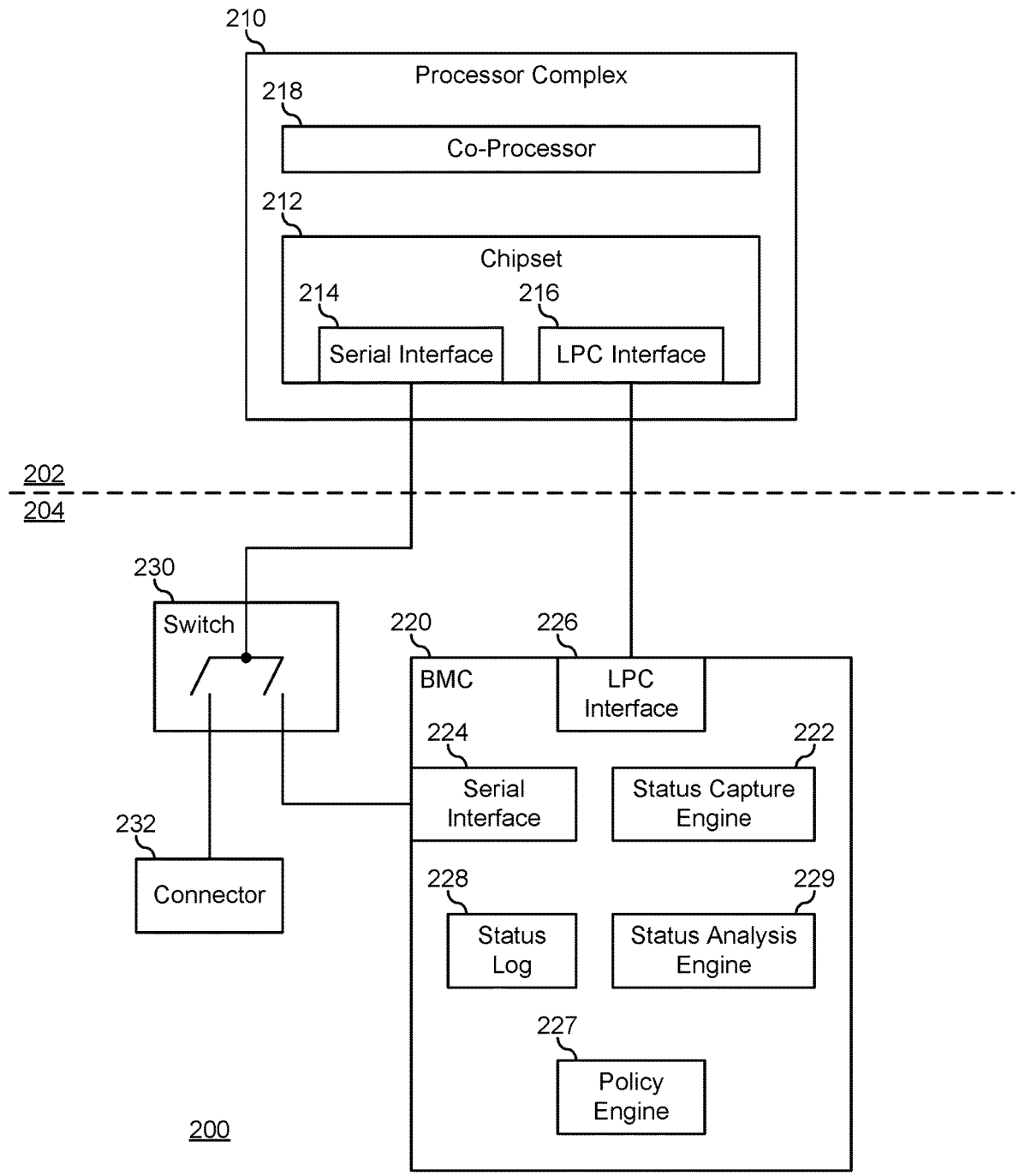
FIG. 2 is a block diagram illustrating an information handling system according to an embodiment of the present disclosure.

FIG. 2 illustrates an information handling system 200 including a host environment 202 and a management block 204. Host environment 202 includes a processor complex 210. Management block 204 includes a BMC 220, a serial bus switch 230, and a serial bus connector 232. Processor complex 210 includes a chipset component 212 and a co-processor 218. Chipset component 212 includes a serial interface 214, and a Low Pin Count (LPC) interface 216. BMC 220 includes a status capture engine 222, a serial interface 224, a LPC interface 226, a policy engine 227, a status log 228, and a status analysis engine 229. An example of BMC 140 includes a commercially available BMC product that operates in accordance with an Intelligent Platform Management Initiative (IPMI) specification, such as a Integrated Dell Remote Access Controller (iDRAC), or the like. An example of co-processor 218 includes a Platform Security Processor (PSP) or another co-processor, as needed or desired.

Serial interface 214 is connected to an input of serial bus switch 230. A first output of serial bus switch 230 is connected to serial bus connector 232, and a second output of the switch is connected to serial interface 224. Serial interfaces 214 and 224, serial bus switch 230, and serial bus connector 232 represent a serial data interface that operates in accordance with a particular serial data interface specification. For example, the serial data interface specification can include a RS-232 interface standard, a Universal Serial Bus (USB) interface specification, another serial data interface specification, or the like, as needed or desired. LPC interface 216 is connected to LPC interface 226.

Host environment 202 operates to provide data processing functionality of information handling system 200, such as is typically associated with an information handling system. As such, processor complex 110 represents a data processing apparatus, such as one or more central processing units (CPUs) or processor cores, and the associated data input and output I/O functionality, such as chipset component 212, and another I/O processor components. Processor complex 210 operates to execute machine-executable code to perform the data processing tasks associated with information handling system 200.

Management block 204 operates to implement and manage various maintenance, operation, and system update processes for information handling system 200 that are not typically associated with the data processing functionality of information handling system 200. For example, management block 204 may provide for out-of-band management of the various code executed on host environment 202, such as BIOS code or UEFI code, firmware code, programs, applications, operating systems, and the like. In particular, management block 204 can operate on a different power plane than host environment 202, such that the management block can download and store updated code for the host environment, even when the host environment is powered off. Management block 204 also operates to monitor and maintain the functions and features of information handling system 200 that are not necessarily associated with the data processing operations performed by host environment 202, such as system thermal and cooling management, fan speed adjustment, power supply monitoring and adjustment, and the like. The mechanisms and method of system management via a BMC are known in the art and are beyond the scope of the present disclosure.

During the system boot process of information handling system 200, various processing tasks are performed to determine the elements that are present on the information handling system, and based upon the detected elements, to initialize and configure the various elements as prescribed by various configuration information for the information handling system. Typically, as the system boot tasks are performed, boot status information as to the progress of the system boot tasks is made available as serial data on serial interface 214. For example, a system BIOS or UEFI may write Power-On Self Test (POST) codes that are associated with the various system boot tasks to a serial port 0x80. In other examples, the boot status information may include other textual information, debug information, or the like gathered by one or more elements of processor complex 210 or co-processor 218. Moreover, various elements of host environment 202 may exert control over different portions of the system boot process, performing the system boot tasks for a particular function of feature, as needed or desired. For example, platform security processor 218 may perform memory initialization tasks for processor complex 210, taking over the execution of some or all of the memory reference code that is typically executed under the control of a platform BIOS or UEFI. Here, the various elements that exert control over the different portions of the system boot process will also make boot status information available as serial data on serial interface 214. For example, platform security processor 218 may write the POST codes associated with the memory reference code to the serial port 0x80. Further boot status information may be provided to BMC 220 from LPC interface 216 to LPC interface 226, as needed or desired.

The boot status information made available on serial interface 214 can be utilized by a designer for troubleshooting during a system design process for information handling system 200. For example, consider when information handling system 200 hangs during the system boot process, that is, when the system boot process gets interrupted and is not completed. The designer, by reading the POST codes from port 0x80, can determine the POST code associated with the last stage of the system boot process that was entered, and can thus narrow down the problem to that particular stage, and can focus the debug effort on that particular stage. Similarly, a service technician can quickly identify problems with information handling system 200 by reading the POST codes from port 0x80. In either case, switch 230 can be set to connect serial interface 214 to connector 232, and the designer or service technician can plug a device with a serial interface into connector 232 to read the POST codes. Switch 230 can selectively be set to connect serial interface 214 to connector 232, to serial interface 224, or to both, as needed or desired. For example, switch 230 can represent a pair of jumpers, on for connecting serial interface 214 to connector 232, and the other for connecting serial interface 214 to serial interface 224, as needed or desired. Switch 230 can also represent a multiplexor that selects whether to connect serial interface 214 to connector 232, to serial interface 224, or to both, based upon a control signal to switch 230. The control signal can be provided from BMC 220, or can be provided based upon a setting of host environment 202, such as based upon a BIOS set-up setting. In a particular embodiment, switch 230 is implemented as a logical function programmed into a Complex Programmable Logic Device (CPLD) of management block 204. Note that debugging of information handling system 200, as described above, is predicated on the presence of a reading device connected to connector 232, and that, in the absence of such a reading device, the boot status information provided on serial interface 214 may be lost. Thus the boot status information for a particular failing instance of the system boot process may be missed by the designer or system technician.

In a particular embodiment, BMC 220 receives and logs boot status information, performs analysis on the boot status information based upon a single system boot process and upon multiple successive system boot processes, and provides indications as to the health of the system boot process based upon the analysis. Here, BMC 220 receives boot status information from host environment 202 by reading the boot status information from serial interface 214, or by receiving the boot status information from LPC interface 216. Status capture engine 222 operates to monitor serial interface 224 and LPC interface 226 to determine when the information received on the interfaces is boot status information. When status capture engine 222 receives the boot status information, the status capture engine determines whether or not to write the boot status information to status log 228. For example, the received boot status information may include a POST code related to a known, understood, or unimportant configuration error. In this case, status capture engine 222 may be configured to ignore the particular POST code by not storing it to status log 228. In a particular embodiment, management block 204 is connected to a management system external to information handling system, and status capture engine 220 operates to provide the boot status information stored in status log 228 to the management system. In a particular embodiment, status capture engine 222 operates to only store status information that has changed from the previous system boot process of information handling system 200. Note that, as illustrated, status log 228 is shown as being part of BMC 220, but this is not necessarily so, and the status log may represent a portion of a memory device associated with management block 204, or another memory device, as needed or desired. Note also that status capture engine 222 is shown as being part of BMC 220. In this case, status capture engine 222 may represent a hardware feature of BMC 220, or a function implemented by BMC firmware. In another embodiment, the functions of status capture engine 222 may be performed by another element of management block 204, such as a CPLD, as needed or desired.

Status analysis engine 229 operates to analyze the boot status information stored in status log 228. In a first-time boot of information handling system 200, status analysis engine 229 determines a baseline status for the system boot process. The baseline status includes the boot status information received during the first-time boot. In addition, status analysis engine 229 determines various correlation information related to the received boot status information. In a particular embodiment, status analysis engine 229 determines a duration of time for each step of the system boot process for the first-time boot of information handling system 200. In another embodiment, status analysis engine 229 determines other status information for information handling system 100 that is available to BMC 220, and can correlate the other status information with the boot status information. For example, status analysis engine 229 can correlate a temperature or temperature rise experienced by information handling system when a particular boot task of the system boot process is being performed, or can correlate a power draw by the information handling system when another boot task is being performed.

Further, the first-time boot of information handling system 200 can be supplemented by other boots of the information handling system in a characterization operation, such as during the manufacturing of the information handling system. Here, because information handling system 200 is known to be in a pristine operational condition, status analysis engine 229 operates to analyze the boot status information stored in status log 228 for the subsequent system boots during the characterization operation. Here, the subsequent status is compared with the baseline status obtained during the first-time boot of information handling system 200, and the differences are characterized as being within operational norms, based upon the pristine operational condition of the information handling system. That is, any variations between the status information gathered during the first-time boot and the subsequent boots can be assumed to represent normal system boot process variations, and such variations are characterized by status analysis engine 229 for later use, as described further, below.

After the characterization operation, information handling system 200 is operated in a production environment, such as when the information handling system has been delivered to a user and is operated by the user to perform the data processing tasks for which the information handling system is intended by the user. In production operations, each time information handling system 200 is booted, status analysis engine 229 operates to analyze the boot status information for the particular system boot process. Here, status analysis engine 229 compares the production status with the baseline status, and generates production differences for that particular system boot process. Status analysis engine 229 then compares the production differences with the baseline differences to identify if the particular system boot process has experienced any behaviors which can be characterized as anomalous behaviors. For example, a particular boot task may take an unusually long time to perform, or a temperature rise associated with another boot task may be greater than usual. As another example, an auxiliary processor (such as co-processor 218) in processor complex 210 can perform bus training during system boot. Bus training can be any number of physical busses, such as DDR or PCIe. Timing parameters that may be captured and output on serial interface 214 will be recorded by BMC 220 as described.

Physical links that may drift over time will be recognized with quantitative data in the output, for example, time to train, or the fact that the physical link was intentionally degraded to a slower speed. When status analysis engine 229 detects anomalous behaviors in a particular system boot process, the status analysis engine logs the anomalous behaviors and issues an alert to, for example, a management system. In this way, problems with information handling system 200 that are detectable through changing system boot process behaviors may be rapidly identified, and preventive or corrective actions can be taken by service technician to remedy the anomalous behaviors. Note that status analysis engine 229 is shown as being part of BMC 220. In this case, status analysis engine 229 may represent a hardware feature of BMC 220, or a function implemented by BMC firmware. In another embodiment, the functions of status analysis engine 229 may be may be performed by another element of management block 204, such as a CPLD, as needed or desired.

Policy engine 227 provides an adjustable texture to the output of status analysis engine 229, such that the parameters associated with the various comparison operations can be updated and modified. For example, because of the effects of extended burn-in of the elements of information handling system 200 over time, a particular boot task may vary over time while such variation may not indicate that a particular problem exists. Here, policy engine 227 can operate to provide that the baseline differences are seen to vary over time to account for the life cycle of the elements of information handling system 200. Further, policy engine 227 can provide for varying levels of notification when anomalous behaviors are detected. For example, a particular user may desire to have different alerts than another user. Here, policy engine 227 can provide that some anomalous behaviors are logged and alerted, while others are not. In a particular embodiment, the analysis performed by status analysis engine 229, and the policy application provided by policy engine 227 are performed by sending the status log information to a management system, and the management system performs the functions of the status analysis engine and the policy engine, as described above.

Figure 3:
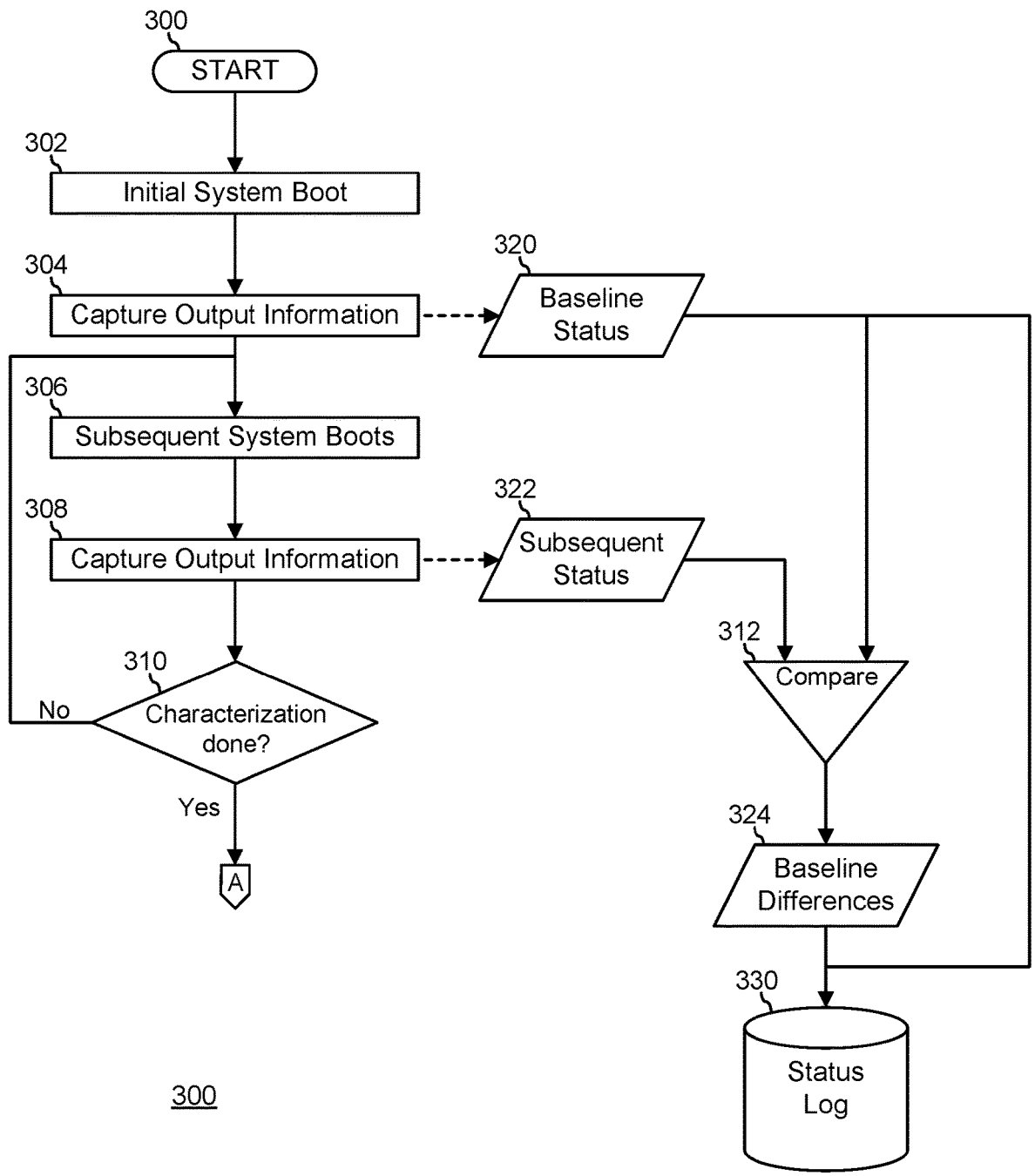
FIGS. 3 and 4 depict a flowchart illustrating a method for information handling system boot status and error data capture and analysis according to an embodiment of the present disclosure.
Figure 4:
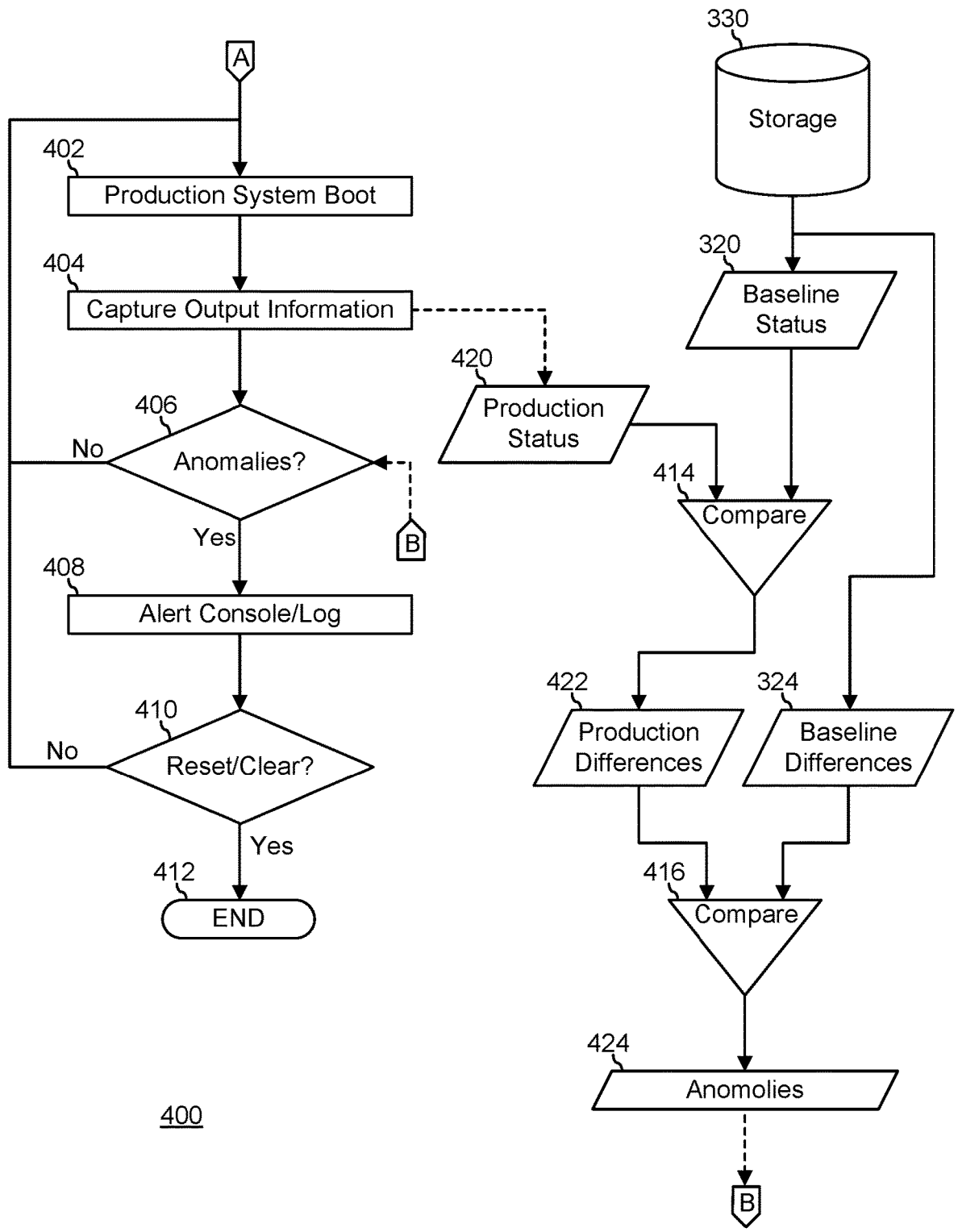

FIGS. 3 and 4 illustrate a method for information handling system boot status and error data capture and analysis. A characterization operation for an information handling system begins at block 300. An information handling system is booted for a first time in block 302, and a status capture engine of a management block captures the boot status information from the various elements of the information handling system that conduct the system boot process in block 304. The status capture engine determines the baseline status information 320 and stores the baseline status information to status log 330. During characterization operations of the information handling system, the information handling system is booted for a next time in block 306, and the status capture engine captures the boot status information from the various elements of the information handling system that conduct the system boot process in block 308. A status analysis engine of the management block determines the subsequent status information 322, compares 312 the subsequent status information with the baseline status information 320 to determine the baseline status differences 324, and stores the baseline status differences to status log 330. After capturing the boot status information for the subsequent system boot process in block 308, a decision is made as to whether or not the characterization operation is done in decision block 310. If not, the "NO" branch of decision block 310 is taken and the method returns to block 306 where the information handling system is booted for a next time.

If the characterization operation is done, the "YES" branch of decision block 310 taken, and production operations begin in block 402 where the information handling system is booted in production, and the status capture engine captures the boot status information from the various elements of the information handling system that conduct the system boot process in block 404. The status capture engine captures the boot status information from the various elements of the information handling system that conduct the system boot process in block 404. The status analysis engine determines the production status information 420, and compares 414 the production status information with the baseline status information 320 to determine the production status differences 422. The production status differences 411 is compared 414 with the baseline status differences 324 to determine if there are any boot anomalies 242. After capturing the boot status information for the production system boot process in block 404, a decision is made as to whether or not the system boot process experienced any anomalies 242 in decision block 406. If not, the "NO" branch of decision block 406 is taken and the method returns to block 402 where the information handling system is booted for a next time. If the system boot process experienced anomalies, the "YES" branch of decision block 406 is taken and the anomalies are logged and an alert is issued in block 408. A decision is made as to whether or not to reset of clear the anomalous boot in decision block 410. If so, the "YES" branch of decision block 410 is taken and the method ends at block 412. If the system is not to be reset or cleared, the "NO" branch of decision block 410 is taken and the method returns to block 402 where the information handling system is booted for a next time.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a processor configured to provide initial boot status information in response to an initial system boot process of the information handling system, to provide characterization boot status information in response to a characterization system boot process of the information handling system, and to provide production boot status information in response to a production system boot process of the information handling system; and
a baseboard management controller (BMC) configured to:

receive the initial, characterization, and production boot status information from the processor;

compare the initial boot status information to the characterization boot status information to determine baseline difference information, wherein the baseline difference information includes first temperature information associated with the characterization system boot process;

compare the initial boot status information to the production boot status information to determine production difference information, wherein the production difference information includes second temperature information associated with the production system boot process;

compare the first temperature information to the second temperature information to determine whether the information handling system experienced an anomaly during the production system boot process; and send an alert that indicates that the production system boot process experienced the anomaly when the information handling system experienced the anomaly during the production system boot process.

2. The information handling system of claim 1, wherein in comparing the baseline difference information with the production difference information, the BMC is further configured to:

determine, from the baseline difference information, that a device of the information handling system initialized to a first state in response to the characterization system boot process;

determine, form the production difference information, that the device was expected to boot to a second state in response to the production system boot process; and determine that the information handling system experienced the anomaly during the production system boot process in response to determining that the device initialized to the first state.

3. The information handling system of claim 2, wherein the first state includes a first status of a physical link and the second state includes a second status of the physical link, and wherein the anomaly is experienced when the first state is degraded as compared with the second state.

4. The information handling system of claim 1, wherein in receiving the initial, characterization, and production boot status information, the BMC is further configured to receive initial, characterization, and production boot status information via a port 0X80 of a serial interface.

5. The information handling system of claim 4, wherein the initial, characterization, and production boot status information includes a plurality of Power-On Self Test (POST) codes.

6. The method of claim 4, wherein the initial characterization, and production boot status information includes a plurality of Power-On Self Test (POST) codes.

7. A method, comprising:

receiving, by a baseboard management controller (BMC) of an information handling system, initial boot status information from a processor of the information handling system in response to an initial system boot process;

receiving, by the BMC, characterization boot status information from the processor in response to a characterization system boot process;

receiving, by the BMC, production boot status information from the processor in response to a production system boot process;

comparing the initial boot status information to the characterization boot status information to determine baseline difference information, wherein the baseline difference information includes first temperature information associated with the characterization system boot process;

comparing the initial boot status information to the production boot status information to determine production difference information, wherein the production difference information includes second temperature information associated with the production system boot process;

comparing the first temperature information to the second temperature information to determine whether the information handling system experienced an anomaly during the production system boot process; and sending an alert that indicates that the production system boot process experienced the anomaly when the information handling system experienced the anomaly during the production system boot process.

8. The method of claim 7, wherein in comparing the baseline difference information with the production difference information, the method further comprises:

determining, from the baseline difference information, that a device of the information handling system initialized to a first state in response to the characterization system boot process;

determining, from the production difference information, that the device was expected to boot to a second state in response to the production system boot process; and determining that the information handling system experienced the anomaly during the production system boot process in response to determining that the device initialized to the first state.

9. The method of claim 8, wherein the first state includes a first status of a physical link and the second state includes a second status of the physical link, and wherein the anomaly is experienced when the first state is degraded as compared with the second state.

10. The method of claim 7, wherein in receiving the initial characterization, and production boot status information, the BMC is further configured to receive the initial, characterization, and production boot status information via a port 0X80 of a serial interface.

11. An information handling system, comprising:

a processor configured to provide initial boot status information in response to an initial system boot process of the information handling system, to provide characterization boot status information in response to a characterization system boot process, and to provide production boot status information in response to a production system boot process of the information handling system, the processor including a serial interface; and a baseboard management controller (BMC) coupled to the serial interface, the BMC configured to:

receive, via the first serial interface, the initial, characterization, and production boot status information from the processor;

compare the initial boot status information to characterization boot status information to determine baseline difference information, wherein the baseline difference information includes a first duration of time associated with the characterization system boot process;

compare the initial boot status information to production boot status information to determine production difference information, wherein the production difference information includes a second duration of time associated with the production system boot process;

compare the first duration of time to the second duration of time to determine whether the information handling system experienced an anomaly during the production system boot process; and send an alert that indicates that the first system boot process experienced the anomaly when the information handling system experienced the anomaly during the production system boot process.

12. The information handling system of claim 11, wherein in comparing the baseline difference information with the production difference information, the BMC is further configured to:

determine, from the characterization system boot status information, that a device of the information handling system initialized to a first state in response to the first characterization system boot process;

determine, form the production boot status information, that the device was expected to boot to a second state in response to the production system boot process; and determine that the information handling system experienced the anomaly during the production system boot process in response to determining that the device initialized to the first state.

13. The information handling system of claim 12, wherein the first state includes a first status of a physical link and the second state includes a second status of the physical link, and wherein the anomaly is experienced when the first state is degraded as compared with the second state.

14. The information handling system of claim 11, wherein in receiving the initial, characterization, and production boot status information, the BMC is further configured to receive initial, characterization, and production boot status information via a port 0X80 of a serial interface.

15. The information handling system of claim 14, wherein the initial, characterization, and production boot status information includes a plurality of Power-On Self Test (POST) codes.

* * * * *